United States Patent
Ito

(12) 
(10) Patent No.: US 6,526,401 B1
(45) Date of Patent: Feb. 25, 2003

(54) DEVICE FOR PROCESSING STRINGS

(75) Inventor: Hideo Ito, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/523,644

(22) Filed: Mar. 10, 2000

(30) Foreign Application Priority Data

Mar. 12, 1999 (JP) .......................................... 11-066251

(51) Int. Cl.[7] .............................................. G06F 17/30
(52) U.S. Cl. ...................................................... 707/3
(58) Field of Search ............................... 707/3, 4, 5, 6, 707/7; 702/3; 700/17, 83; 382/181, 209; 711/100; 706/45

(56) References Cited

U.S. PATENT DOCUMENTS 5,875,108 A * 2/1999 Hoffberg et al. .............. 700/17

OTHER PUBLICATIONS

A. Changcheng Huang; Devetsikiotis, M.; Lambadaris, I.; Kaye, A.R. discloes fast simulation for self–similar traffic in ATM networks Communications, 1995. ICC '95 Seattle, 'Gateway to Globalization', 1995 IEEE International Conference on , vol.: 1 1995.*

J. G. Cleary, et al. "Unbounded Length Contexts for PPM", The Computer Journal, vol. 40, No. 2/3, 1997, p. 67–75.

U. Manber, et al., "Suffix arrays: A new method for on–line string searches", SIAM Journal of Computing, vol. 22, No. 5, 1993, p. 1–16.

* cited by examiner

*Primary Examiner*—Diane D. Mizrahi
(74) *Attorney, Agent, or Firm*—Dickstein Shapiro Morin & Oshinsky LLP

(57) ABSTRACT

A corpus is stored in a corpus-DB portion. A series of position numbers built for the corpus is stored in an index portion. A searching portion searches for positions of occurrences of a part of an input string in the corpus using the series of position numbers. A predicting portion, using the result of search performed by the searching portion, predicts a probability of occurrence of a character following the part of the input string.

12 Claims, 5 Drawing Sheets

FIG.1A

| 0 | 1 | 2 | 3 | 4 | 5 | 6 |
|---|---|---|---|---|---|---|
| B | A | N | A | N | A | $ |

FIG.1B

| 5 | 3 | 1 | 0 | 4 | 2 |
|---|---|---|---|---|---|

DEVICE FOR PROCESSING STRINGS

BACKGROUND OF THE INVENTION

1. Field of the Invention

The present invention relates to a device for processing strings, which device predicts a probability of occurrence of a character following a given string, and, in particular, to a device for processing strings, which device predicts a probability of occurrence of each character of a string from a left context of the character in the string.

2. Description of the Related Art

PPM (Prediction by Partial Matching) is well used as a statistical language model in text compression. PPM* is a variant of PPM (see 'Unbounded Length Context for PPM', the Computer Journal, Vol. 40, No. 2/3, 1997, pages 67–75, written by J. G. Cleary and M. J. Teahan of the Department of Computer Science, University of Waikato, Hamilton, New Zealand, and 'Japanese Word Segmentation by a PPM* Model', NL report, 128-2 (1998. 11.5), pages 9–16, written by Hiroki Oda and Kenji Kita of the Faculty of Engineering, Tokushima University). The PPM* is characterized in that no upper limit is set on the number of order n (context length) of the model.

In PPM*, a string indexing structure through which it is possible to store past contexts compactly, and to refer to and to perform additions/deletions on them flexibly at high speed is needed. As such a string indexing structure, a trie (see the above-mentioned document 'Unbounded Length Context for PPM') or the like is used in the related art.

However, when the trie or the like is used as the string indexing structure, increase in the scale of context requires a large storage capacity.

Further, PPM* in the related art uses a relatively simple context-selection method, and performance of predicting an appearance probability of each character of an input string is not sufficient.

SUMMARY OF THE INVENTION

An object of the present invention is to provide a string-processing device in which the size of a string indexing structure to be stored can be reduced even when the scale of context increases.

Another object of the present invention is to provide a string-processing device having high performance in predicting an appearance probability of each character of an input string.

In order to achieve the above-mentioned objects, a device for processing strings according to the present invention comprises:

- a corpus-DB portion in which a corpus is stored;
- an index portion in which a series of position numbers built for the corpus is stored;
- a searching portion which searches for positions of occurrences of a given string in the corpus using the series of position numbers; and
- a predicting portion which, using the result of search performed by the searching portion, predicts a probability of occurrence of a character following the given string.

In this arrangement, when a probability of occurrence of a character following the given string is predicted in an algorithm such as PPM*, a series of position numbers (such as a suffix array) built for a corpus is used instead of a trie or the like. Thereby, in comparison to the related art in which a trie or the like is used, it is possible to search positions of occurrences of the given string at high speed through binary search. As a result, it is possible to improve the performance of predicting a probability of occurrence of a subsequent character. Furthermore, it is possible to reduce the amount of storage required for a string indexing structure.

Other objects and further features of the present invention will become more apparent from the following detailed description when read in conjunction with the accompanying drawings.

BRIEF DESCRIPTION OF THE DRAWINGS

FIG. 1A shows an example of a text array (corpus); and FIG. 1B shows an example of a suffix array built for the text;

DETAILED DESCRIPTION OF THE PREFERRED EMBODIMENT

Figure 2:
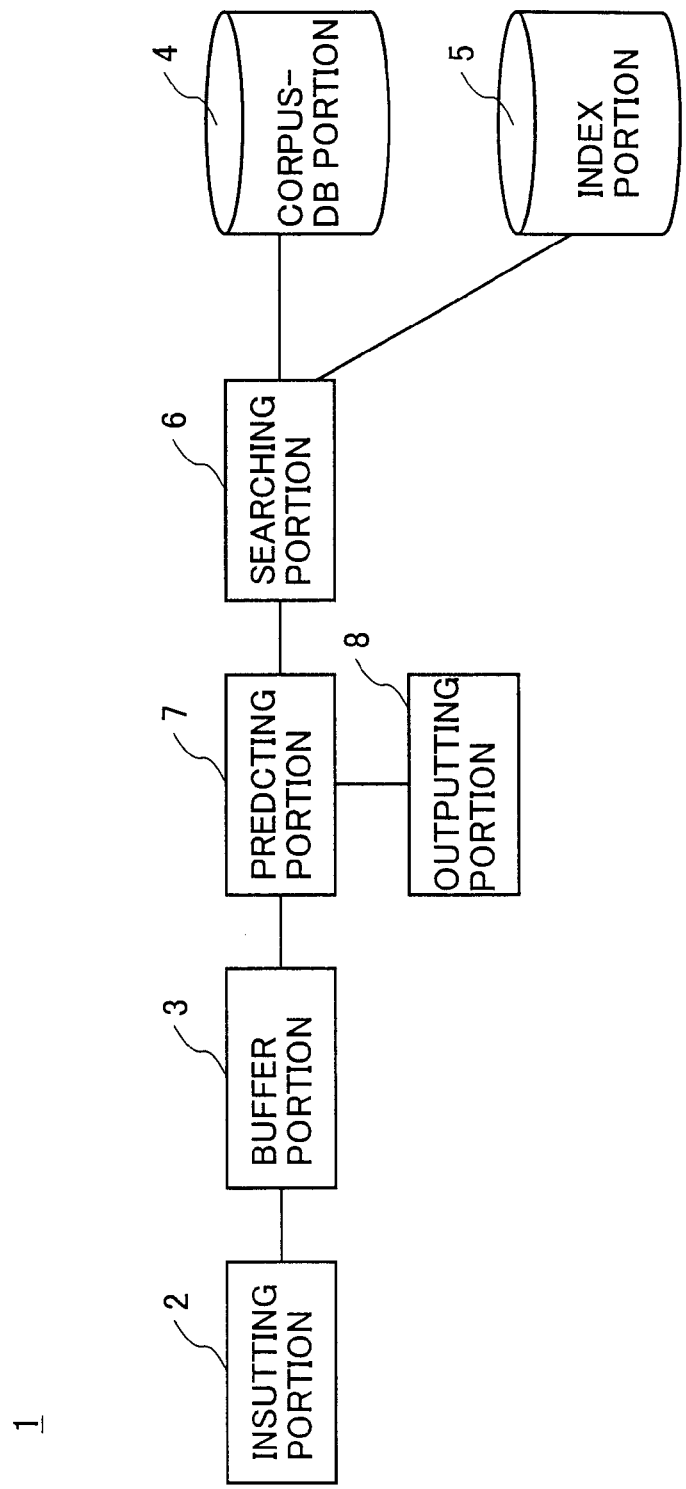
FIG. 2 shows a functional block diagram of a string-processing device in one embodiment of the present invention.

First, PPM* will now be described. A finite set of an alphabet is referred to as 'A', and the elements of 'A' are called characters. A string is to be input to a language model using PPM*. It is assumed that $x_0, x_1, \ldots, x_{i-1}$ have been input up to a certain time point. Each $x_k$ (k=0, 1, ..., i-1) represents a character. The main point of an n-gram model such as PPM* is prediction of the following conditional probability:

$$p(x_i|x_0, x_1, \ldots, x_{i-1}) \qquad (1)$$

In the above expression, $x_i$ is a character which is predicted to be subsequently input, and $$\Sigma_{x_i \in A} p(x_i|x_0, x_1, \ldots, x_{i-1}) = 1.$$

A set C (referred to as a set of contexts) is prepared, each element of which set is a pair of a string $c_n$ having a length 'n' and a function $f_n(x)$ which provides a frequency of occurrence of a character x immediately after $c_n$. At this time, $c_n$ is called a context of order 'n'. In order to predict the above-mentioned probability, $c_n$ (n=−1, 0, 1, 2, ..., m) is extracted from the elements of the set of contexts, wherein $c_n$ partially matches the conditional part $(x_0, x_1, \ldots, x_{i-1})$ in a condition in which the right end of the string of the conditional part is the starting point of the matching. The set consisting of the thus-extracted elements is called a set of matched contexts. A context of order 0 is an empty string, and corresponds to a uni-gram. Further, a context of order −1 is provided as an imaginary context, and is caused to function as a context for a character (unknown character) not occurring immediately after the context of order 0. It is supposed that each of the contexts of order 0 and order −1 partially matches an arbitrary string.

The above-mentioned probability is predicted using the frequency function $f_m(x)$ of the context $c_m$, having the maximum order m, of the set of matched contexts, as follows:

$$p_m = p(x_i | x_0, x_1, \ldots, x_{i-1}) = f_m(x_i)/(C_m + t) \quad (2)$$

where $C_m = \Sigma_{x \in A} f_m(x)$, and 't' is the number of different characters, for each of which $f_m(x) > 0$. When the above-mentioned probability $p_m$ is 0, this means that $x_i$ is unknown for the context $c_m$. The following escape probability is assigned to the entire set of unknown characters for the context $c_m$:

$$e_m = t/(C_m + t) \quad (3)$$

Because the above escape probability is for the entire set of unknown characters, the respective probabilities for the particular unknown characters are obtained as a result of the above escape probability being distributed to the particular unknown characters as a result of the above escape probability being multiplied by probabilities obtained using the context of order m' which is smaller than m by 1.

For further particulars with regard to PPM*, see 'Unbounded Length Context for PPM', the Computer Journal, Vol. 40, No. 2/3, 1997, pages 67–75, written by J. G. Cleary and M. J. Teahan of Department of Computer Science, University of Waikato, Hamilton, New Zealand, the entire contents of which are hereby incorporated by reference.

Second, a suffix array will now be described.

In an embodiment of the present invention, for PPM*, the suffix array is used instead of a trie or the like which is used for PPM* in the related art.

A string of a length N is expressed by $a_0, a_1, \ldots, a_{N-1}$, where $a_i$ is an element of a finite set $\Sigma$ of the alphabet, and is called a character. $|\Sigma|$ expresses the total number of characters composing the alphabet. For the characters, particular character values are defined, respectively, and the so-called lexicographical order <, =, > is defined between strings, based on the thus-defined character values. A string $S_i = a_i, a_{i+1}, \ldots, a_{N-1}$ of a text $T = a_0, a_1, \ldots, a_{N-1}$ is called 'a suffix starting from the i-th character from the top of the text T'. The position of the character 'i' is called a pointer. The suffix array for the text is a series of the pointers $A = p_0, p_1, \ldots, p_{N-1}$ having a length N obtained as a result of all the suffixes being lined up in the lexicographical order. Accordingly the lexicographical order between the suffixes is such that $S_{p0} < S_{p1} < \ldots < S_{pN-1}$.

Search for a string is performed through binary search of the text.

Figures 1A, 1B:
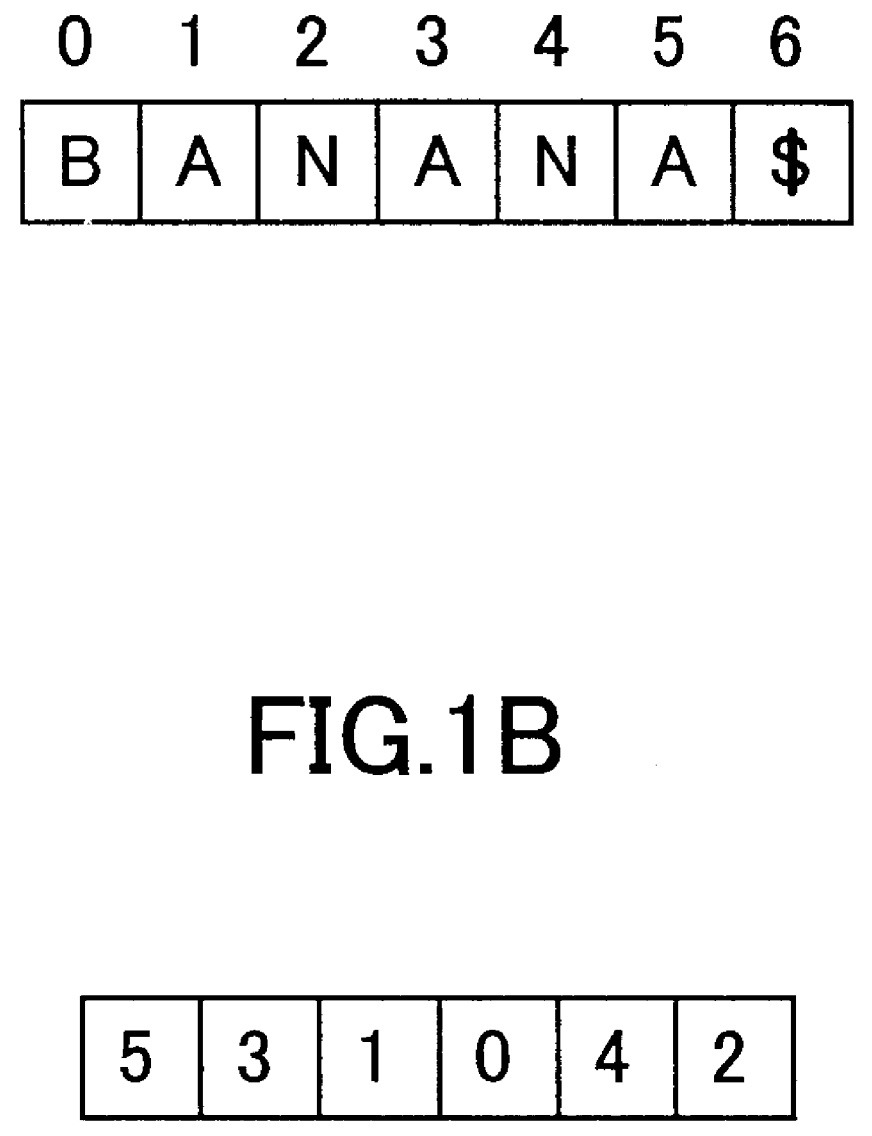

Further, in order to fix the lexicographical order between the suffixes, an imaginary character (for example, $) not included in the alphabet is added to the end of the text. As a character value of "$", the minimum value 0 is assumed. Further, as data structures for expressing the text and series of pointers, respectively, arrays are used. FIG. 1A shows the array of a text "BANANA" and the suffix array thereof.

For further particulars with regard to the suffix array, see 'Suffix arrays: a new method for on-line string searches', SIAM Journal of Computing, Vol. 22, No. 5, pages 935–948, 1993, written by U. Manber and G. Myers.

Third, a string-processing device in the embodiment of the present invention will now be described. FIG. 2 shows a functional block diagram of the string-processing device 1.

The string-processing device 1 obtains a probability of occurrence of the character positioned subsequent to each character of a string $I = x_0, x_1, \ldots, x_n$. The string $I = x_0$, $x_1, \ldots, x_n$ is input to an inputting portion 2, and is stored in a buffer portion 3.

A corpus stored in a corpus-DB portion 4 is previously reversed, and the suffix array S is generated for the thus-obtained corpus, the thus-generated suffix array S being stored in an index portion 5. Assuming that the number of characters included in the corpus is N, S is an integer array having a length N, and, the value of each element S[i] thereof indicates the position of the respective character in the corpus, and one-to-one-corresponds to the respective suffix, the starting point of which suffix being the position of that character. The elements of the array S are sorted in the lexicographical order using the corresponding suffixes as the keys. For a string which is used as the search key, binary search is performed on the corpus through the array S. Thereby, all the positions of occurrences of the string in the corpus are obtained in a certain continuous region, $S[i,j] = S[i], S[i+1], \ldots, S[j]$, of the array S.

Figure 3:
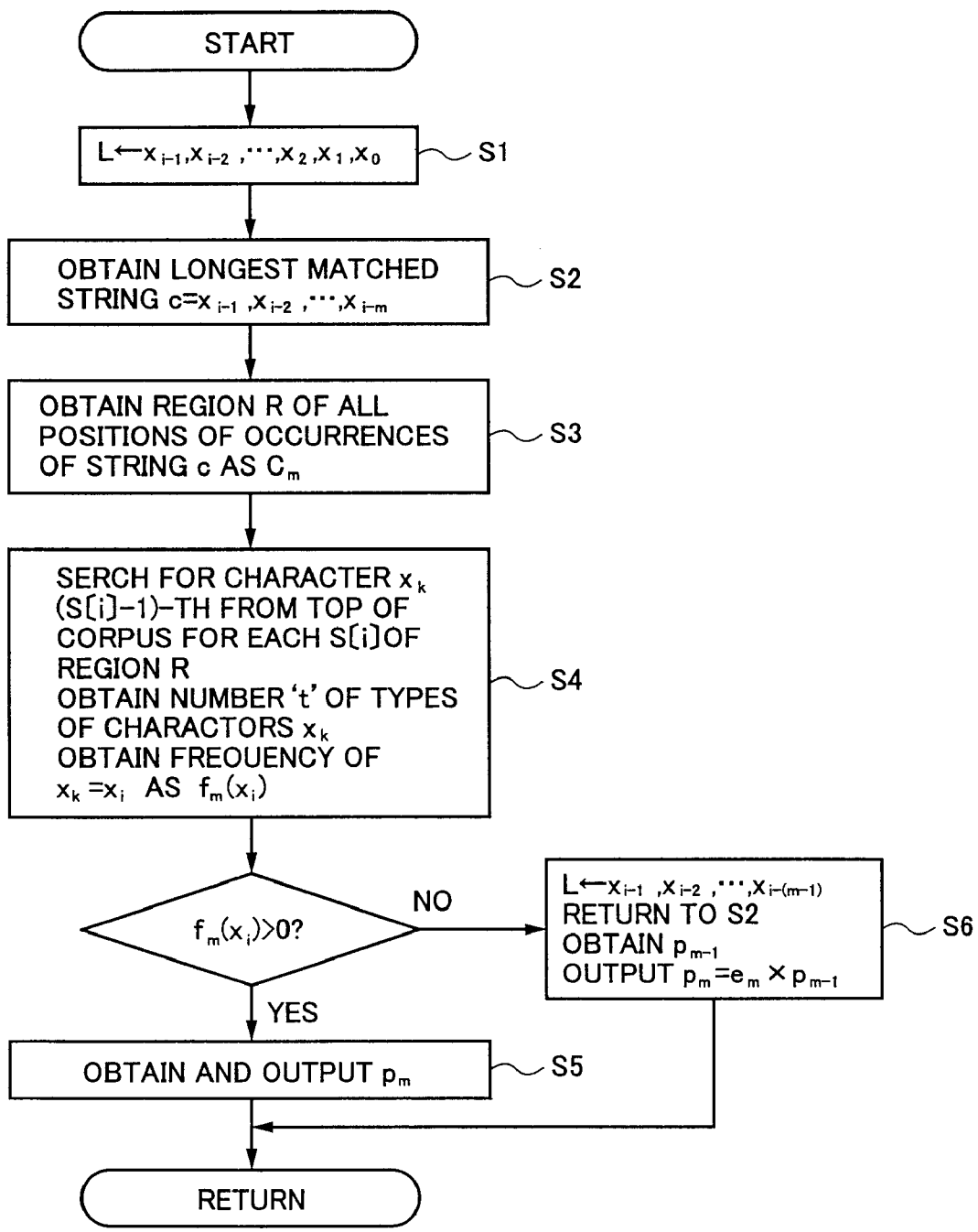
FIG. 3 shows a flow chart of operations performed by the string-processing device shown in FIG. 2.

A searching portion 6 and a predicting portion 7 carry out an operation algorithm of PPM* using the suffix array, as indicated by the following steps S1 through S6 shown in FIG. 3. Specifically, for each position $i = 0, 1, \ldots, n$ of the string $I = x_0, x_1, \ldots, x_n$ input through the inputting portion 2, the following steps S1 through S6 are performed:

Step S1:

$$L \leftarrow x_{i-1}, x_{i-2}, \ldots x_2, x_1, x_0$$

Step S2: Using L as the key, binary search is performed on the corpus through the suffix array. Thereby, the longest matched string $c = x_{i-1}, x_{i-2}, \ldots, x_{i-m}$ is obtained, wherein 'c' is a context of order m.

Step S3: The certain continuous region R of the suffix array S, in which region all the positions of occurrences of the context 'c' in the corpus are stored, is obtained through binary search. The size of the thus-obtained region R indicates the frequency of the context 'c' of the order m, and is represented by $C_m$.

The above-described steps S1, S2 and S3 are carried out by the searching portion 6.

Step S4: For each element S[i] in the region R, a character $x_k$ located (S[i]−1)-th from the top in the corpus is searched for. Then, the number 't' of different characters of the thus-obtained characters $x_k$ is obtained. Further, when $x_k = x_i$ occurs, the frequency thereof is obtained. This value corresponds to the value of the above-mentioned $f_m(x_i)$.

Step S5: When $f_m(x_i) > 0$, the probability $p_m$ is obtained from the above-mentioned equation (2) and is output through an outputting portion 8, and the current processing is finished.

Step S6: When $f_m(x_i) = 0$, $$L \leftarrow x_{i-1}, x_{i-2}, \ldots, x_{i-(m-1)}$$

Then, processing is returned to the step S2, and a probability $p_{m-1}$ is obtained. Then, $e_m \times p_{m-1}$ is output through the outputting portion 8, and the current processing is finished. The escape probability $e_m$ is obtained from the above-mentioned equation (3).

The above-described steps S4, S5 and S6 are carried out by the predicting portion 7.

The above-described recursive escaping processing (back-off) is carried out until occurrence of the subsequent character $x_i$ is obtained from the corpus. For an unknown character which cannot be obtained even when the order is 0 (that it, a uni-gram), a probability $p_{-1} = 1/|A|$ is output for a context of order −1, and the current processing stops, where $|A|$ is the size of the alphabet.

In PPM, when the order exceeds a certain value, the more the order increases, the more the performance is degraded. That is, because the number of characters, for which probabilities are predicted, is reduced when the order increases, escape occurs frequently. And, then, degradation of the performance due to coarse prediction of escape probability becomes conspicuous. Therefore, in order to improve the performance of prediction of probabilities of occurrences of subsequent characters, the following two methods, a method 1 and a method 2, are used in the string-processing device 1.

The method 1 will now be described. When a context is selected for predicting a probability of occurrence of a certain character, information of a context selected for predicting a probability of occurrence of a character immediately before that certain character is used. Specifically, the upper limit of the length of a context to be currently used is one obtained as a result of 1 being added to the length of a context used immediately prior thereto.

The method 2 will now be described. In this method, selection of a context of high order is restrained in context selection, in a situation in which a possibility of escape is potentially high. For example, in a case where characters to be processed in PPM are those of the Japanese language, character-type information is used. Specifically, the upper limit of the length of a context used subsequently is determined to be 1 when the character at the right end of a currently used context is a type of symbol (for example, ')' (parenthesis)), and the upper limit of the length of a context used subsequently is determined to be 3 when the character at the right end of a currently used context is hiragana (the rounded Japanese phonetic syllabary).

Figure 4:
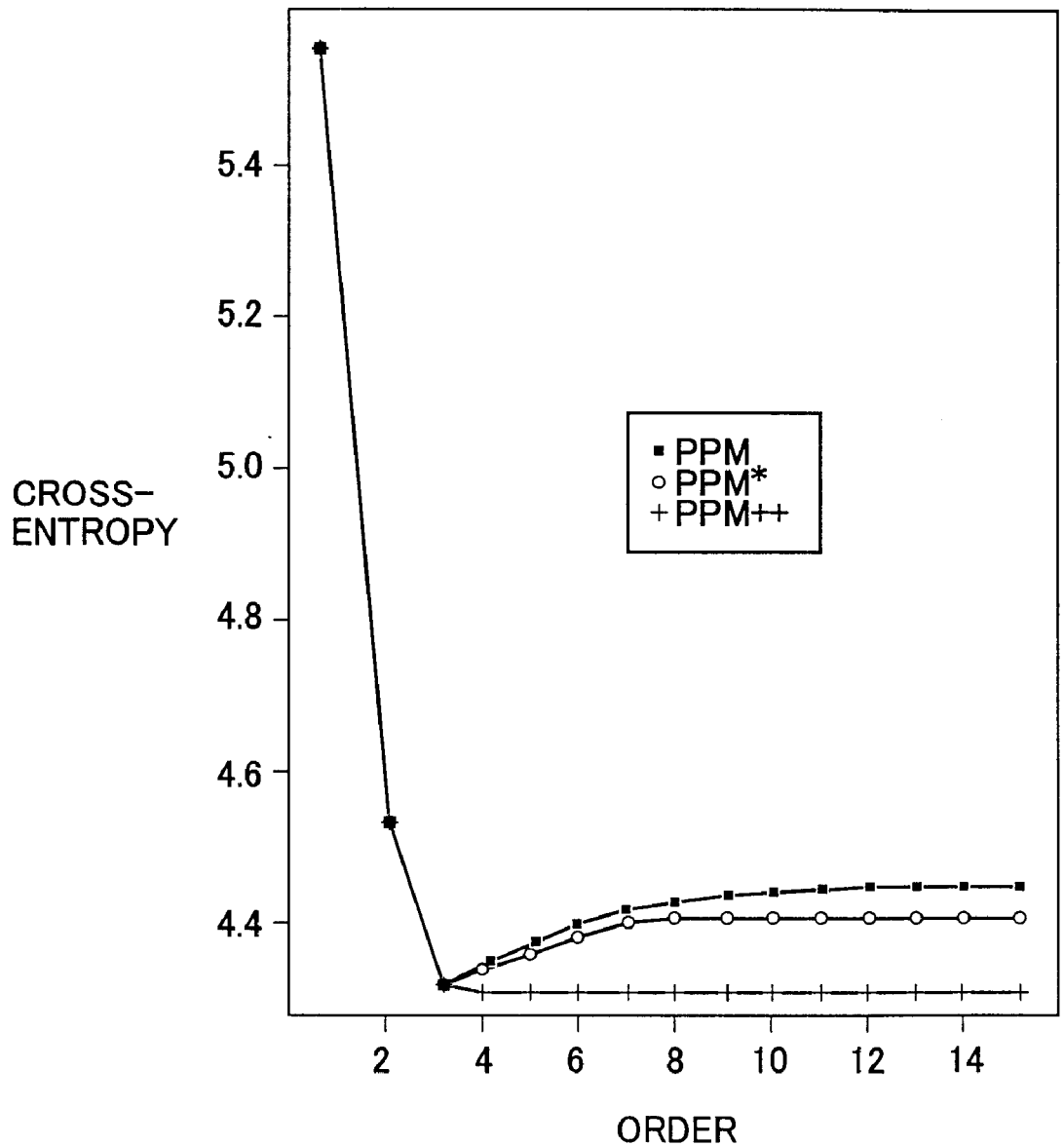
FIG. 4 is a graph showing results of measurements of performances versus the number of order of context for PPM, PPM* and PPM++.

PPM* to which the above-described methods 1 and 2 are applied is called PPM++ here. FIG. 4 shows a result of measurement of performance (here, cross-entropy, well used for evaluation of performance of a statistical language model) for each of PPM, PPM* and PPM++. As can be seen from the graph of FIG. 4, even when the order of context increases, the cross-entropy is kept low and thus high performance is maintained in the case of PPM++ in comparison to PPM and PPM*.

Thus, by using the above-described method 1 and/or method 2 in the string-processing device, it is possible to increase the performance of predicting a probability of occurrence of a subsequent character.

The present invention can also be applied for predicting a probability of occurrence of a character predicted to follow an already-input string. In this case, in above-described the step S1, a string $x_{i-1}, x_{i-2}, \ldots, x_2, x_1, x_0$ is the already-input string, and $x_i$ is the character predicted to follow thereto.

Figure 5:
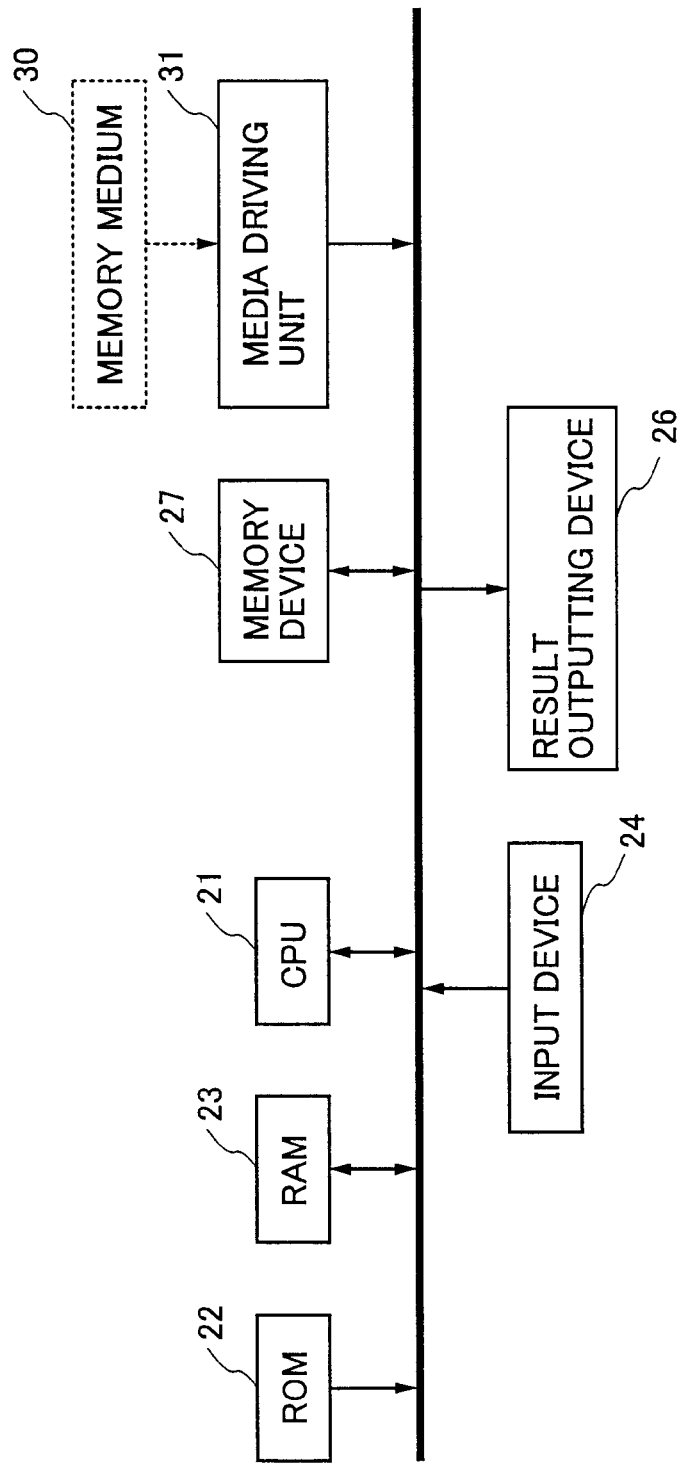
FIG. 5 is a block diagram showing a hardware configuration of the string-processing device shown in FIG. 2.

FIG. 5 is a block diagram showing one example of a hardware configuration of the string-processing device shown in FIG. 2. As shown in FIG. 5, the string-processing device may be implemented by using a personal computer or the like, and includes a CPU 21, a ROM 22, a RAM 23, an input device 24, a result outputting device 26 and a memory device 27. The CPU 21 attends to overall control. The ROM 22 stores control programs and the like used by the CPU 21. The RAM 23 is used as a work area by the CPU 21. The input device 24 is used for inputting strings. The result outputting device (e.g., display or printer) 26 outputs results of prediction of character-occurrence probabilities. The memory device 27 is used as the corpus-DB portion 4 and index portion 5.

The CPU provides functions of the searching portion 6 and predicting portion 7, shown in FIG. 2.

The functions of the searching portion 6 and predicting portion 7 are implemented via software, which is supplied in a software package stored in a memory medium such as a CD-ROM. In FIG. 5, therefore, the string-processing device further includes a media driving unit 31, which drives a memory medium 30 when it is set in the driving unit 31.

In other words, the string-processing device according to the present invention may be implemented such that a general-purpose computer system has programs loaded thereto from a memory medium such as a CD-ROM, and allows a micro-processor thereof to execute string-processing. In this configuration, programs for performing string processing of the present invention (i.e., programs used by the hardware system) are supplied by way of a memory medium. The memory medium for storing the programs is not limited to a CD-ROM, but includes a ROM, a RAM, a flexible disk, a memory card, etc. The programs stored in the memory are installed in a memory device built in as part of the hardware system. An example of such a memory device is a hard-disk drive. The programs are executed so as to provide the functions of the string processing.

The programs for providing the string processing of the present invention may be supplied via a communication channel from a server, for example, instead of being supplied in the form of a memory medium.

Further, the present invention is not limited to the above-described embodiment and variations and modifications may be made without departing from the scope of the present invention.

The present application is based on japanese priority application no. 11-066251, filed on Mar. 12, 1999, the entire contents of which are hereby incorporated by reference.

What is claimed is:

1. A device for processing strings comprising:
   a corpus-DB portion in which a corpus is stored;
   an index portion in which a series of position numbers, built for said corpus, is stored;
   a searching portion, which searches for positions of occurrences of a given string in said corpus using said series of position numbers; and
   a predicting portion which, using a result of search performed by said searching portion, predicts a probability of occurrence of a character following said given string.

2. A device for processing strings comprising:
   a corpus-DB portion in which a corpus is stored;
   an index portion in which a series of position numbers built for said corpus is stored;
   a searching portion which searches for positions of occurrences of a part of an input string in said corpus using said series of position numbers; and
   a predicting portion which, using the result of search performed by said searching portion, predicts a probability of occurrence of a character following said part of said input string.

3. The device for processing strings as claimed in claim 2, wherein said predicting portion, when selecting a context for performing the prediction, uses information of a context selected for the prediction for an immediately preceding character.

4. The device for processing strings as claimed in claim 3, wherein said predicting portion, when selecting a context for performing the prediction, uses the length of a context selected for the prediction for an immediately preceding character.

5. The device for processing strings as claimed in claim 2, wherein said prediction portion, when the input string is a string of Japanese-language characters and when selecting a context for the prediction, uses character-type information of Japanese-language characters.

6. The device for processing strings as claimed in claim 5, wherein said prediction portion, when the input string is a string of Japanese-language characters, determines the order of a context to be used for the prediction using character-type information of Japanese-language characters.

7. A device for processing strings comprising:

means for storing a corpus;

means for storing a series of position numbers built for said corpus;

means for searching for positions of occurrences of a given string in said corpus using said series of position numbers; and means for, using the result of the search, predicting a probability of occurrence of a character following said given string.

8. A device for processing strings comprising:

means for storing a corpus;

means for storing a series of position numbers built for said corpus;

means for searching for positions of occurrences of a part of an input string in said corpus using said series of position numbers; and means for, using the result of the search, predicting a probability of occurrence of a character following said part of said input string.

9. A method of conducting string processing comprising the steps of:

a) storing a corpus;

b) storing a series of position numbers built for said corpus;

c) searching for positions of occurrences of a given string in said corpus using said series of position numbers; and d) predicting, using the result of the search, a probability of occurrence of a character following said given string.

10. A method of conducting string processing comprising the steps of:

a) storing a corpus;

b) storing a series of position numbers built for said corpus;

c) searching for positions of occurrences of a part of an input string in said corpus using said series of position numbers; and d) predicting, using the result of the search, a probability of occurrence of a character following said part of said input string.

11. A machine-readable memory medium having a program embodied therein for causing a computer to perform string processing, said program comprising:

a corpus-DB portion configured to store a corpus;

an index portion configured to store a series of position numbers built for said corpus;

a searching portion configured to search for positions of occurrences of a given string in said corpus using said series of position numbers; and a predicting portion configured to, using the result of search performed by said searching portion, predict a probability of occurrence of a character following said given string.

12. A machine-readable memory medium having a program embodied therein for causing a computer to perform string processing, said program comprising a device for processing strings comprising:

a corpus-DB portion configured to store a corpus;

an index portion configured to store a series of position numbers built for said corpus;

a searching portion configured to search for positions of occurrences of a part of an input string in said corpus using said series of position numbers; and a predicting portion configured to, using the result of search performed by said searching portion, predict a probability of occurrence of a character following said part of said input string.

* * * * *